United States Patent
Nam et al.

(10) Patent No.: US 10,015,418 B2
(45) Date of Patent: Jul. 3, 2018

(54) TDI LINE IMAGE SENSOR INCLUDING SOURCE FOLLOWER AMPLIFIERS

(71) Applicant: VIEWORKS CO., LTD., Gyeonggi-do (KR)

(72) Inventors: Jung Hyun Nam, Gyeonggi-do (KR); Kyoung Ryoul Seo, Gyeonggi-do (KR)

(73) Assignee: VIEWORKS CO., LTD., Anyang-si, Gyeonggi-Do (KR)

( * ) Notice: Subject to any disclaimer, the term of this patent is extended or adjusted under 35 U.S.C. 154(b) by 0 days.

(21) Appl. No.: 15/311,384

(22) PCT Filed: May 14, 2015

(86) PCT No.: PCT/KR2015/004855
§ 371 (c)(1),
(2) Date: Nov. 15, 2016

(87) PCT Pub. No.: WO2015/174761
PCT Pub. Date: Nov. 19, 2015

(65) Prior Publication Data
US 2017/0085812 A1    Mar. 23, 2017

(30) Foreign Application Priority Data
May 15, 2014    (KR) .................. 10-2014-0058501

(51) Int. Cl.
*H04N 5/357*    (2011.01)
*H04N 5/372*    (2011.01)
*H04N 5/369*    (2011.01)

(52) U.S. Cl.
CPC ........... *H04N 5/357* (2013.01); *H04N 5/3692* (2013.01); *H04N 5/3698* (2013.01); *H04N 5/372* (2013.01); *H04N 5/37206* (2013.01)

(58) Field of Classification Search
CPC .. H04N 5/357; H04N 5/37206; H04N 5/3698; H04N 5/3692; H04N 5/372
See application file for complete search history.

(56) References Cited

U.S. PATENT DOCUMENTS

| | | | | |
|---|---|---|---|---|
| 6,831,998 | B1* | 12/2004 | Koshishiba | G06K 9/00973 356/237.1 |
| 2013/0057931 | A1* | 3/2013 | Mayer | H04N 5/37206 358/494 |

(Continued)

FOREIGN PATENT DOCUMENTS

| JP | H0993490 A | 4/1997 |
|---|---|---|
| JP | H10257269 A | 9/1998 |

(Continued)

OTHER PUBLICATIONS

International Search Report in International Application No. PCT/KR2015/004855, filed May 14, 2015.

(Continued)

*Primary Examiner* — Gevell Selby
(74) *Attorney, Agent, or Firm* — Saliwanchik, Lloyd & Eisenschenk

(57) ABSTRACT

The present invention provides a TDI line image sensor. The TDI line image sensor according to the present invention is characterized by comprising: a pixel unit, which has N line sensors having M CCDs arranged in a line and being arranged horizontally to a scan direction, horizontally moves charges accumulated in the respective columns of the line sensors, and accumulates same; and an output unit for parallelly receiving as inputs the charges accumulated in the pixel unit from the respective columns, performing analog-to-digital conversion on and storing the charges, and then sequentially outputting same.

1 Claim, 3 Drawing Sheets

(56) References Cited

U.S. PATENT DOCUMENTS

2013/0112853 A1* 5/2013 Suyama ............... H04N 5/3722
 250/208.1
2014/0054443 A1 2/2014 Faramarzpour et al.

FOREIGN PATENT DOCUMENTS

| JP | 2013-098420 A | 5/2013 |
| KR | 20000018460 A | 4/2000 |
| KR | 20090023573 A | 3/2009 |
| WO | WO 2014/021417 A1 | 2/2014 |

OTHER PUBLICATIONS

Nie, Kaiming et al., Thirty Two-Stage CMOS TDI Image Sensor With On-Chip Analog Accumulator, IEEE Transactions on Very Large Scale Integration (VLSI) Systems, Apr. 2014, 22(4):951-956.
Supplementary European Search Report dated Apr. 26, 2017 in European Application No. 15793516.4.
Office Action dated Oct. 17, 2017 in Japanese Application No. 2016-567850.

* cited by examiner

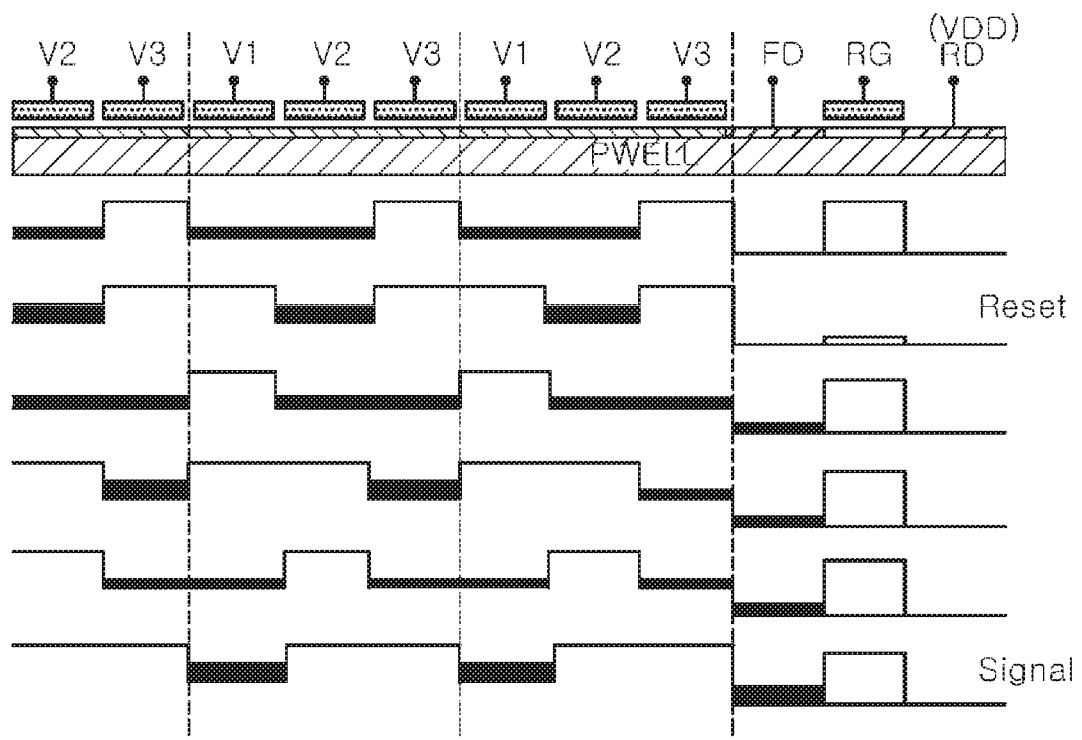

TDI LINE IMAGE SENSOR INCLUDING SOURCE FOLLOWER AMPLIFIERS

CROSS-REFERENCE TO RELATED APPLICATION

This application is the U.S. national stage application of International Patent Application No. PCT/KR2015/004855, filed May 14, 2015, which claims priority to Korean Application No. 10-2014-0058501, filed May 15, 2014, the disclosures of each of which are incorporated herein by reference in their entirety.

TECHNICAL FIELD

The present invention relates to a time delay integration (TDI) line image sensor, and more particularly, to a TDI line image sensor including a pixel unit, which accumulates charges through charge-coupled devices (CCDs) in a TDI method, and an output unit, which performs analog-to-digital (AD) conversion on the charges accumulated in the CCDs in each column, stores the charges in a memory buffer, and then sequentially outputs the charges, and thereby capable of improving resolution and a transmission rate and reducing power consumption and noise due to characteristics of a CCD and a complementary metal-oxide-semiconductor (CMOS) device.

BACKGROUND ART

Recently, with mass production, automation, and refinement of production facilities, functions which rely on the naked eye of a person or various types of sensors have been increasingly replaced by vision machines including image sensors. Charge-coupled devices (CCDs) are semiconductor devices that are mainly used in these image sensors.

A CCD refers to a device capable of transmitting a charge from one device to another adjacent device. An image sensor including such CCDs has a structure in which a change of an amount of free charges in each cell due to an amount of light is converted into an electrical signal.

Structurally, the CCD mainly includes a cell area in which charges are substantially accumulated due to an amount of light, and an output unit including a shift register which serves as a path through which the accumulated charges are sequentially transmitted.

The CCDs are divided into an area scan method, a line scan method, a time delay integration (TDI) line scan method, and the like according to a method in which cells are arranged in an array and an image is generated.

An image sensor using a line scan method (hereinafter referred to as a "line sensor") is a one-dimensional sensor in which pixels which receive image light are arranged in a line. When a two-dimensionally widened image is imaged, a subject is sequentially imaged line by line by moving the line sensor or the subject.

That is, the line scan method is a method in which one line is exposed and transmitted at an arbitrary speed at a time, and has an advantage in that a high-speed and high-resolution image may be obtained with low cost compared to an area scan method. For example, while 4M pixels are required in the area scan method in order to obtain a frame having a size of 2048*2048, frames having various sizes such as 2048*2048, 2048*1000, and the like may be obtained using only 2K pixels in the line scan method.

However, when a high-speed scan method such as a case in which a subject which is moving at a high speed is imaged or a case in which a subject is imaged by moving a line sensor at a high speed is performed, since accumulation and transmission of charges at the high speed are repeated in each line, a time during which the charges may be accumulated per line is reduced, and thus an amount of light of the image becomes insufficient. Thus, demand for an amount of light is increasing, but the amount of light may not be indefinitely increased due to a limitation of a lighting device.

Accordingly, while research on increasing sensitivity by improving materials of a pinned-photodiode (PPD), a complementary metal-oxide-semiconductor (CMOS) sensor, and the like has been progressing, a method in which an amount of light is accumulated by arranging several line sensors to increase sensitivity has been proposed.

In an image sensor using a TDI line scan method (hereinafter referred to as a "TDI line image sensor"), line sensors are arranged as a plurality of stages in a scan direction, charges accumulated in CCDs in each line are synchronized with movement of an image, and are transmitted to CCDs in a next line. The charges overlap and are then output by repeating the process until the last line sensor, and as a result, an image having a sufficiently satisfactory amount of light may be obtained even in a high-speed scan method.

The related art of the present invention is disclosed in Korean Unexamined Patent Application Publication No. 2009-0023573 (published on Mar. 5, 2009, Invention Title: Method for Controlling a TDI-CCD Image Sensor).

DISCLOSURE

Technical Problem

The present invention is directed to providing a time delay integration (TDI) line image sensor in which charges accumulated in charge-coupled devices (CCDs) in each line are horizontally moved to CCDs in an adjacent next line, are moved to a last line and accumulated, and are then output to a signal processing unit by vertically moving the charges accumulated in the last line, and data with respect to each cell may be sequentially processed in units of lines.

As described above, when the charges accumulated in the CCDs are horizontally moved to an adjacent line, the charges are moved in parallel by being synchronized with movement of an image, however when the accumulated charges are vertically moved in order to be output to the signal processing unit, since the accumulated charges are transmitted by serially moving the accumulated charges one by one in a stopped state, there is a problem in that it takes a lot of time when the accumulated charges are vertically moved.

Specifically, in the TDI line image sensor, since the number of CCDs vertically arranged in series in each line is relatively greater than the number of lines horizontally arranged in a scan direction in order to have high resolution, there is a problem in that the accumulated charges vertically moving and being output cause scanning an image through the TIN line sensor to take a lot of time.

The present invention is provided to address the above-described problems, and embodiments of the present invention are directed to providing a TDI line image sensor including a pixel unit, which accumulates charges through CCDs in a TDI method, and an output unit, which performs analog-to-digital (AD) conversion on charges accumulated in CCDs in each column, stores the charges in a memory buffer, and then sequentially outputs the charges, and capable of improving resolution and a transmission rate and reducing power consumption and noise due to characteristics of a CCD and a complementary metal-oxide-semiconductor (CMOS) device.

Technical Solution

One aspect of the present invention provides a time delay integration (TDI) line image sensor, the sensor including a pixel unit including N line sensors having M charge-coupled devices (CCDs) arranged in a line, wherein the N line sensors are arranged horizontally in a scan direction, configured to horizontally move charges accumulated in respective columns of the line sensors and accumulate the charges, and an output unit configured to receive the charges accumulated in the pixel unit from the respective columns in parallel as inputs, perform analog-to-digital (AD) conversion on the charges, store the charges, and then sequentially output the charges.

The output unit may include M amplifiers configured to receive the charges accumulated in the pixel unit from the respective columns in parallel as inputs at a charge storage node and respectively amplify the charges, M AD converters configured to respectively perform AD conversion on signals output from the amplifiers, and a memory buffer configured to store and sequentially output outputs of the AD converters.

The amplifiers may be source follower amplifiers.

Advantageous Effects

A time delay integration (TDI) line image sensor according to the present invention includes a pixel unit, which accumulates charges through charge-coupled devices (CCDs) in a TDI method, and an output unit which performs analog-to-digital (AD) conversion on charges accumulated in CCDs in each column, stores the charges in a memory buffer, and then sequentially outputs the charges, and thus resolution and a transmission rate can be improved and power consumption and noise can be reduced due to characteristics of a CCD and a complementary metal-oxide-semiconductor (CMOS) device.

DESCRIPTION OF DRAWINGS

FIG. 3 is a view for describing movement of charges in the TDI line image sensor according to one embodiment of the present invention.

MODES OF THE INVENTION

Figure 1:
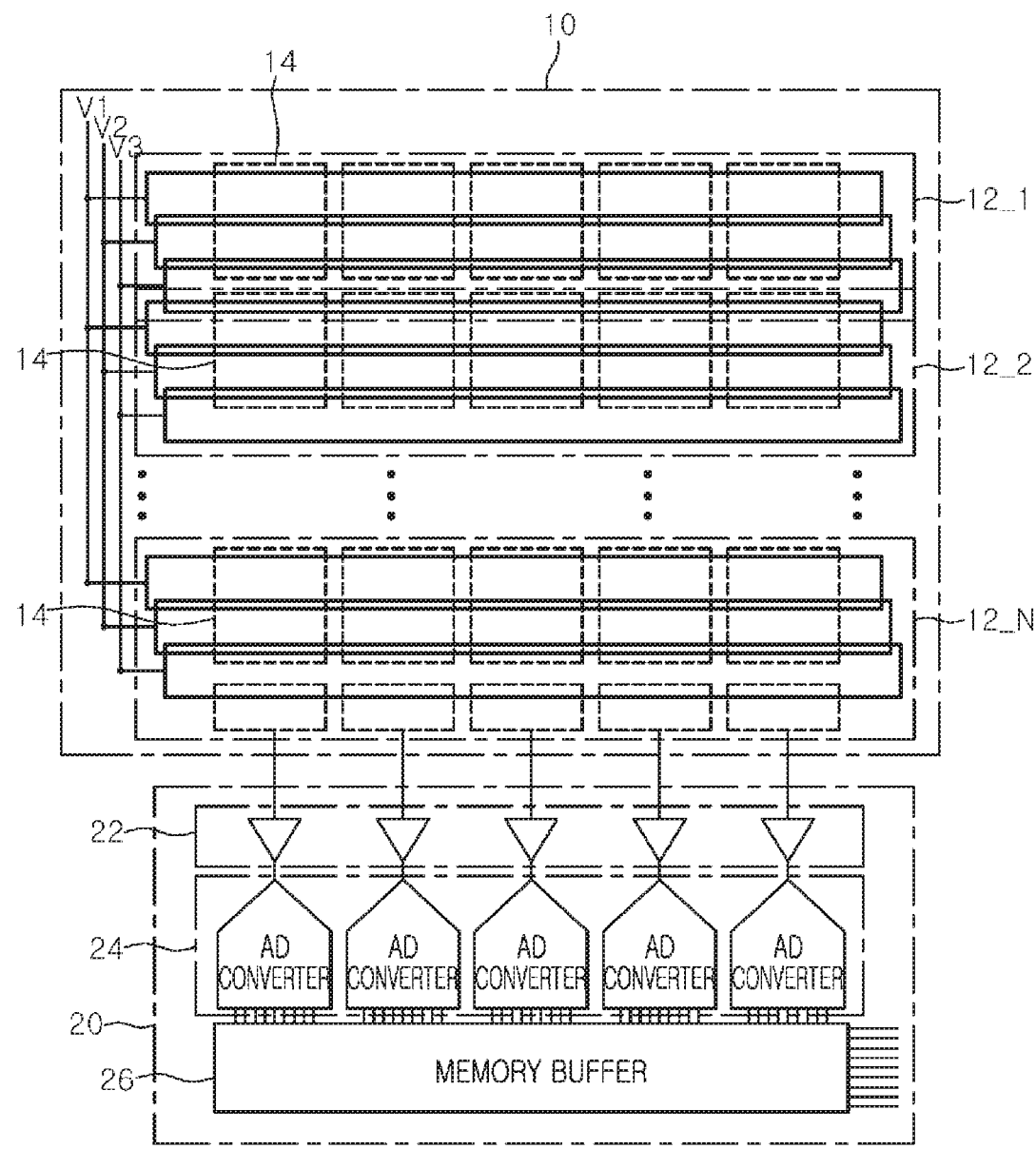
FIG. 1 is a block diagram illustrating a time delay integration (TDI) line image sensor according to one embodiment of the present invention.

Hereinafter, a time delay integration (TDI) line image sensor according to one embodiment of the present invention will be described with reference to the accompanying drawings. In this process, thicknesses of lines, sizes of components, and the like illustrated in the drawings may be exaggerated for clarity and convenience of description.

Further, some terms which will be described below are defined in consideration of functions in the present invention and meanings may vary depending on, for example, a user or operator's intentions or customs. Therefore, the meanings of these terms should be interpreted based on the scope throughout this specification.

Figure 2:
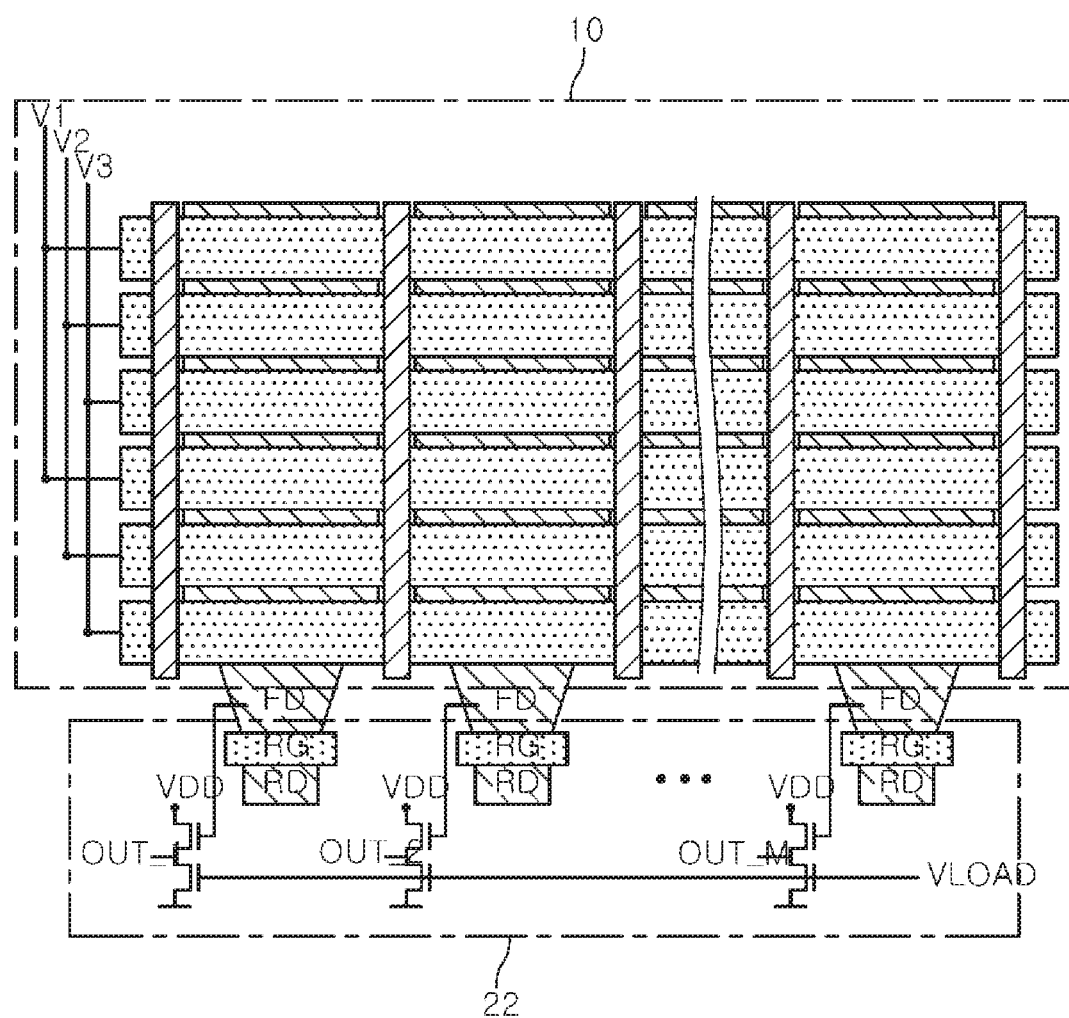
FIG. 2 is a view illustrating a structure of a pixel unit of the TDI line image sensor according to one embodiment of the present invention.

FIG. 1 is a block diagram illustrating the TDI line image sensor according to one embodiment of the present invention, FIG. 2 is a view illustrating a structure of a pixel unit of the TDI line image sensor according to one embodiment of the present invention, and FIG. 3 is a view for describing movement of charges in the TDI line image sensor according to one embodiment of the present invention.

As illustrated in FIGS. 1 and 2, the TDI line image sensor according to one embodiment of the present invention includes a pixel unit 10 and an output unit 20.

The pixel unit 10 includes N line sensors 12_1 to 12_N each having M charge-coupled devices (CCDs) 14 arranged in a line, wherein the N line sensors 12_1 to 12_N are horizontally arranged in a scan direction, horizontally move charges accumulated in respective columns of line sensors 12_1 to 12_N using a TDI method, and accumulate the charges.

That is, as illustrated in FIG. 3, each of the charges accumulated in the CCDs 14 is moved to an adjacent CCD 14 by sequentially controlling voltages V1, V2, and V3 of each of the CCDs 14, overlaps a charge storage node FD, and is output.

Since a configuration of the pixel unit 10 corresponds to a general configuration of a pixel unit of a TDI line image sensor, a detailed description of the configuration will be omitted in the present embodiment.

The output unit 20 includes amplifiers 22, analog-to-digital (AD) converters 24, and a memory buffer 26 so as to receive charges accumulated in the pixel unit 10 from the respective columns in parallel as inputs, perform AD conversion on the charges to output a digital signal, store the digital signal, and then sequentially output the digital signal.

In order to amplify each of the charges accumulated in the pixel unit 10 by receiving the charges from the respective columns in parallel to charge storage nodes ED as inputs, the amplifiers 22 include M amplifiers so as to correspond to the number of the CCDs 14 arranged in a single line sensor 12_1 to 12_N.

In this case, the amplifiers 22 may be configured as source follower amplifiers in which charges are moved from a last line sensor 12_N of the pixel unit 10, the charges are turned on according to accumulated electric potentials of the charge storage nodes ED, and voltage values thereof are output.

The AD converters 24 respectively perform AD conversion on signals output from the M amplifiers 22.

The memory buffer 26 stores image signals converted into digital signals in the M AD converters 24, then sequentially outputs the image signals and allows a signal processing unit (not illustrated) to process the image signals for each line.

When the TDI line image sensor configured in this way performs scanning and imaging, the charges accumulated in the CCDs 14 of each of the line sensors 12_1 to 12_N of the pixel unit 10 using a TDI method are synchronized with the scanning, are moved to an adjacent line sensor 12_1 to 12_N in respective columns thereof, and are output to the charge storage nodes FD of the output unit 20.

After the charges accumulated in the charge storage nodes FD are amplified through the amplifiers 22, AD conversion is performed on the charges, and the charges are output as signals. Then, the charge storage nodes FD may be reset to have a voltage VDU connected to a reset drain RD through a reset gate RG, and may receive charges of a next line sensor 12_1 to 12_N as inputs.

In this way, since the pixel unit 10 is configured in a TDI method through the CCDs, a high-resolution image having a sufficiently satisfactory amount of light may be obtained.

Further, since the charges stored in the charge storage nodes FD of the output unit 20 are amplified through the amplifiers 22, are converted into digital signals in the AD converters 24, are stored in the memory buffer 26, and are then output without being moved through the CCDs, a degree of integration may be improved and a transmission rate may be improved even with less power consumption due to a complementary metal-oxide-semiconductor (CMOS) device.

As described above, in the TIN line image sensor according to the embodiment of the present invention, since the pixel unit is configured to accumulate charges through the CCDs in a TDI method and the output unit is configured to perform AD conversion on the charges accumulated in the CCDs in each column, store the charges in the memory buffer, and then sequentially output the charges, resolution and a transmission rate may be improved and power consumption and noise may be reduced due to characteristics of a CCD and a CMOS device.

While the present invention has been described with reference to the embodiment illustrated in the accompanying drawings, the embodiment should be considered in a descriptive sense only, and it should be understood by those skilled in the art that various alterations and equivalent other embodiments may be made.

Therefore, the scope of the present invention should be defined by only the following claims.

The invention claimed is:

1. A time delay integration (TDI) line image sensor, the sensor comprising: a pixel unit including N line sensors each having M charge-coupled devices (CCDs) arranged in a line, wherein the N line sensors are arranged horizontally in a scan direction, configured to horizontally move charges accumulated in respective columns of the line sensors and accumulate the charges, wherein N and M are integers greater than 1; and an output unit configured to receive the charges accumulated in the pixel unit from the respective columns in parallel as inputs, perform analog-to-digital (AD) conversion on the charges to output a digital signal, store the digital signal, and then sequentially output the digital signal, wherein the output unit comprises: M amplifiers configured to receive the charges accumulated in the pixel unit from the respective columns in parallel as inputs at charge storage nodes and respectively amplify the charges; M AD converters configured to respectively perform AD conversion on signals output from the amplifiers; and a memory buffer configured to store and sequentially output the digital signal of the AD converters; wherein the amplifiers are configured as source follower amplifiers that are turned on according to electric potentials of the charge storage nodes and output voltage values, the electric potentials being based on charges accumulated at the charge storage nodes.

* * * * *